(12) United States Patent
Bennett (10) Patent No.: US 8,126,396 B2
(45) Date of Patent: Feb. 28, 2012

(54) WIRELESS NETWORK THAT UTILIZES CONCURRENT INTERFERING TRANSMISSION AND MIMO TECHNIQUES

(75) Inventor: James D. Bennett, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 1077 days.

(21) Appl. No.: 11/641,143

(22) Filed: Dec. 18, 2006

(65) Prior Publication Data

US 2008/0112499 A1 May 15, 2008

Related U.S. Application Data

(63) Continuation-in-part of application No. 11/595,346, filed on Nov. 9, 2006.

(51) Int. Cl.
*H04B 7/00* (2006.01)
*G01R 31/08* (2006.01)
*H04L 12/28* (2006.01)
(52) U.S. Cl. .................. 455/41.2; 370/230; 370/431
(58) Field of Classification Search .................. None
See application file for complete search history.

(56) References Cited

U.S. PATENT DOCUMENTS 5,574,979 A 11/1996 West
(Continued)

FOREIGN PATENT DOCUMENTS

CN 1717900 A 1/2006
(Continued)

*Primary Examiner* — Yuwen Pan
*Assistant Examiner* — Ayodeji Ayotunde
(74) *Attorney, Agent, or Firm* — Garlick Harrison & Markison; Jessica W. Smith (57) ABSTRACT

A wireless network infrastructure that adapts frame parameters of concurrent interfering and MIMO transmission and receptions in response to dynamically varying channel conditions. The channel conditions are determined by number of associated wireless end point devices within a cell, their capabilities, anticipated bandwidth usage, QOS (Quality Of Service) demands, priority of service and idle states, cell overlap interferences, near-far interferences and noises. The wireless network infrastructure consists of an access point that is adapted to transmit concurrent interfering transmissions, using a multiple input/multiple output scheme. The access point responds to the dynamically varying channel conditions by adapting the frame parameters of the concurrent interfering transmissions and parameters of multiple input/multiple output schemes.

22 Claims, 9 Drawing Sheets

U.S. PATENT DOCUMENTS

| | | | |
|---|---|---|---|
| 6,353,617 B1 * | 3/2002 | Cadd et al. | 370/445 |
| 6,490,262 B1 * | 12/2002 | Hogger | 370/337 |
| 6,819,661 B2 | 11/2004 | Okajima et al. | |
| 6,907,044 B1 * | 6/2005 | Yonge et al. | 370/445 |
| 7,634,232 B2 * | 12/2009 | Waxman | 455/63.1 |
| 2002/0061031 A1 | 5/2002 | Sugar et al. | |
| 2003/0139196 A1 * | 7/2003 | Medvedev et al. | 455/522 |
| 2003/0161282 A1 * | 8/2003 | Medvedev et al. | 370/329 |
| 2004/0028155 A1 | 2/2004 | Dornstetter et al. | |
| 2004/0100941 A1 * | 5/2004 | Lim et al. | 370/349 |
| 2004/0136349 A1 * | 7/2004 | Walton et al. | 370/338 |
| 2005/0111419 A1 * | 5/2005 | Kwon et al. | 370/338 |
| 2006/0050718 A1 | 3/2006 | Corson et al. | |
| 2006/0092888 A1 | 5/2006 | Jeong et al. | |
| 2006/0133273 A1 * | 6/2006 | Julian et al. | 370/230 |
| 2006/0135075 A1 * | 6/2006 | Tee et al. | 455/67.13 |
| 2006/0285485 A1 * | 12/2006 | Agrawal et al. | 370/208 |
| 2007/0054625 A1 | 3/2007 | Beale | |
| 2007/0281617 A1 | 12/2007 | Meylan et al. | |

FOREIGN PATENT DOCUMENTS

| | | |
|---|---|---|
| KR | 1020060063702 A | 6/2006 |

* cited by examiner

WIRELESS NETWORK THAT UTILIZES CONCURRENT INTERFERING TRANSMISSION AND MIMO TECHNIQUES

CROSS REFERENCES TO RELATED APPLICATIONS

The present application is a continuation-in-part of Utility application Ser. No. 11/595,346 filed on Nov. 9, 2006, and entitled "ADAPTIVE NETWORK SUPPORTING SINGLE TO CONCURRENT INTERFERING WIRELESS TRANSMISSIONS," (BP5761), which is incorporated herein in its entirety by reference for all purposes.

The present application is related to the following co-pending applications:

1. Utility Application Ser. No. 11/641,197 filed on Dec. 18 2006, and entitled "CELL PROTOCOL ADAPTING BETWEEN SINGLE AND CONCURRENT INTERFERING TRANSMISSIONS AND RECEPTIONS BASED ON CHANNEL CONDITIONS," (BP5788);

2. Utility Application Ser. No. 11/641,198 filed on Dec. 18 2006, and entitled "WIRELESS NETWORK THAT ADAPTS CONCURRENT INTERFERING TRANSMISSION PARAMETERS BASED ON CHANNEL CONDITIONS," (BP5929); and 3. Utility Application Ser. No. 11/641,144 filed on Dec. 18 2006, and entitled "CELL SUPPORTING SIMULTANEOUS AND DIFFERING CONCURRENT INTERFERING TRANSMISSION PARAMETERS AND TECHNIQUES," (BP5930), all of which are incorporated by reference in their entirety for all purposes.

BACKGROUND

1. Technical Field

The present invention relates generally to wireless communication; and, more particularly, to wireless access points in a packet switched network.

2. Related Art

In a wireless local area network, wireless access points are conveniently used in wide variety of public and private environments, to provide wireless routing services to a plurality of mobile wireless end point devices. Typically, these routing services connect mobile wireless end point devices to a backbone network. One of the prominent backbone networks is Internet, another being Intranet. Thus, today wireless access points provide wireless access to the Internet in may public places such as restaurants, air ports, public buildings as well as at homes. Often a plurality of wireless access points is bridged to provide additional coverage area. Mobile end point wireless devices include personal or laptop computers, servers, set top boxes and handheld data/communication devices. The communication between wireless access points and the end point wireless devices occur on the basis of predefined sets of rules or protocols.

Channel conditions that include number of associated mobile wireless end point devices within a cell, bandwidth usage, QOS (Quality of Service), priority of service, interferences and noises, create performance bottlenecks in the wireless local area network. The wireless access points, in these situations, are unable to provide the necessary bits per second transfer rate to the mobile wireless end point devices and the mobile end users face problems such as slow speeds and broken connections. These channel conditions vary dynamically over a period of time, in public environments such as restaurants and airports, depending upon the above mentioned factors. For example, a mobile end user communicating using VoIP (Voice over Internet Protocol) may face drag in voice and disconnections periodically.

These and other limitations and deficiencies associated with the related art may be more fully appreciated by those skilled in the art after comparing such related art with various aspects of the present invention as set forth herein with reference to the figures.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
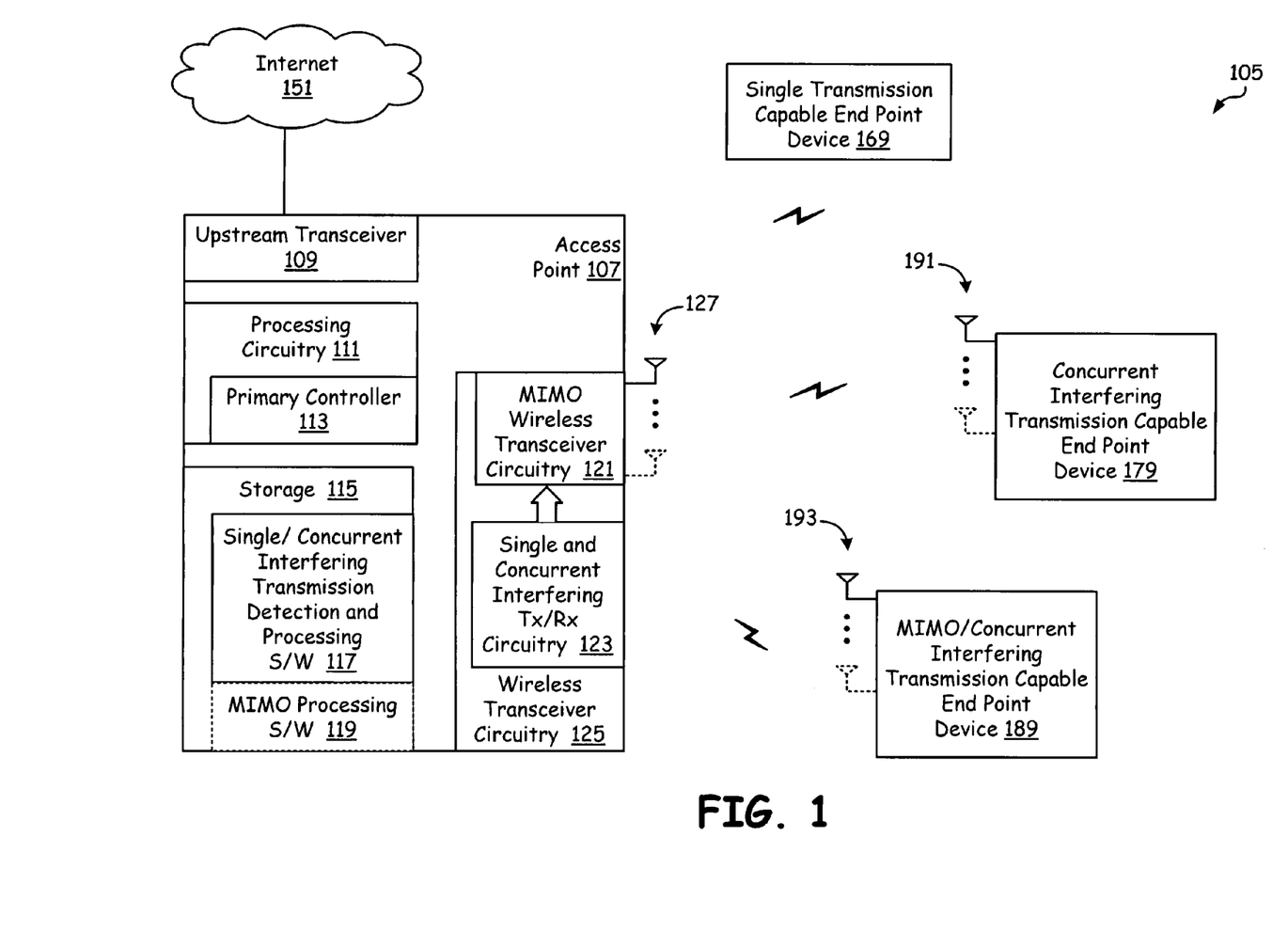
FIG. 1 is a block diagram illustrating a wireless access point that adapts parameters of concurrent interfering and Multiple Input/Multiple Output (MIMO) transmissions and receptions, based on varying channel conditions, in accordance with the present invention.

FIG. 1 is a block diagram 105 illustrating a wireless access point 107 that adapts parameters of concurrent interfering and Multiple Input/Multiple Output (MIMO) transmissions and receptions, based on varying channel conditions, in accordance with the present invention. A plurality of wireless end point devices such as 169, 179 and 189, each of which may be differently able in terms of single, concurrent interfering and MIMO capabilities, utilize the services of wireless access point 107 in different capacities, at different periods. Possibly, there are four types of capabilities for wireless end point devices that are associated with the wireless access point 107, they are: (a) single transmission capable devices, such as 169;

(b) concurrent interfering transmission capable devices, such as 179; (c) MIMO/single transmission capable devices (not shown); and (d) MIMO/concurrent interfering transmission capable devices, such as 189. In addition to varying capabilities, the bandwidth requirements, noises and interferences vary with time. These factors create variations in terms of load upon the wireless access point 107 and thus create a dynamically varying channel conditions. This affects the efficiency and performance of the wireless access point 107. The wireless access point 107 responds to the dynamically varying channel conditions, in every frame or sub-frame, by adapting to one or more of: (a) single transmissions and receptions; (b) partial concurrent interfering transmissions and receptions; (c) full concurrent transmissions and receptions; (d) payload length; and (e) MIMO transmissions and receptions, using two or more radio transceivers. By adapting the above mentioned parameters, the wireless access point 107 compensates for the overheads associated with concurrent interfering transmissions and receptions and optimizes its performance in the face of varying load conditions. To adapt, the wireless access point 107 initially identifies the capabilities of each of the wireless end point devices 169, 179 and 189.

The wireless access point 107 adapts by utilizing many variety of modes available while providing routing services to each of the plurality of wireless end point devices 169, 179 and 189. The modes available to the wireless access point 107 includes single transmission mode, a plurality of partial concurrent interfering transmission modes (say, partial concurrent interfering transmission modes a through n), full concurrent interfering transmission mode and a plurality of MIMO transmission modes (utilizing two or more transceivers). The adaptation also includes varying payload length. The considerations for adaptation are different for transmission and reception, since the wireless access point's 107 load conditions during transmissions and receptions may vary independently. The wireless access point 107 broadcasts mode selection that is applicable to a next frame, within the wireless network infrastructure, during a beacon period. In addition, the wireless access point 107 independently communicates MIMO transmission modes to each of the wireless end point devices that possess MIMO capabilities, such as 189.

In a legacy single transmission mode, only a single transmission or reception occurs at a time, and all other transmissions are considered as interferences. The MIMO transmission modes may be utilized, if the wireless end point devices are MIMO capable, such as 189. During a single transmission mode, the coding aggressiveness is minimal, therefore the overhead associated with coding is also minimal. This mode is suitable, for example, when all of the associated wireless end point devices are only single transmission capable or when the loading on the wireless access point is minimal. A beacon period that precedes the payload portion of the frame is utilized to communicate determination of single transmission mode and payload length. The frame may include contention free period and contention period. During contention free period, the wireless end point devices 169, 179 or 189 wait for a brief Short Inter Frame Space (SIFS) and then begin to transmit. Similarly, the wireless access point 107 may also transmit data to any one of the wireless end point devices 169, 179 or 189 during contention free period after a SIFS interval. During contention period, the wireless end point devices 169, 179 and 189 or the wireless access point 107 place a Request To Send (RTS) signal and after obtaining Clear To Send (CTS) signal from recipient, begin transmitting data. After completion of transmission of data, the wireless end point devices 169, 179 and 189 or the wireless access point 107 receive an acknowledgement (ACK) signal to confirm that the data is received by the recipient. Any contention from a plurality of devices is resolved on the basis of arbitration, as per protocol.

For any given frame, the wireless access point 107 adapts to a partial concurrent interfering transmission mode a through n, based upon number wireless end point devices 169, 179 and 189 associated at that time and their individual capabilities, existing channel conditions and overhead associated with partial concurrent interfering transmission coding. The MIMO transmission modes may also be utilized simultaneously, if the wireless end point devices are MIMO capable, such as 189. Any determination of such partial concurrent interfering transmission mode and MIMO transmission mode provides optimal performance under given circumstances.

In a contention free period, a partial concurrent interfering transmission mode, say mode a, may involve allowing a selected number of wireless end point devices 169, 179 and/or 189 to transmit or receive. The wireless access point 107 resolves any such signals received from the selected number of wireless end point devices 169, 179 and/or 189. In addition, some of these selected wireless end point devices 169, 179 and/or 189 may receive or transmit using MIMO transmission mode. For example, one of the plurality of wireless end point devices 169, 179 or 189 may determine that this is a contention free period, identify number of devices utilizing the services of the wireless access point 107 and depending on SIFS may begin to transmit data.

During a contention period, the wireless end point devices 169, 179 and 189 may have to place RTS and depending on the CTS from the wireless access point 107 may begin to transmit data. After completion of transmission of data, the wireless end point devices 169, 179 and/or 189 receive ACK signal from the wireless access point 107. A full concurrent interfering transmission mode, on the contrary, may not impose any restrictions on the wireless end point devices 169, 179 and 189 at all, allowing any number of wireless end point devices 169, 179 and/or 189 to transmit.

In addition to the modes described in the above paragraphs and payload length adaptations, the wireless access point 107 suitably utilizes MIMO capabilities of the wireless end point devices such as 189. In other words, a plurality of transceivers situated in the wireless access point 107 and wireless end point devices such as 189 are utilized as needed to communicate. The frames of single, partial or full concurrent interfering transmission modes are transmitted by using space-time block coding, to any specific wireless end point device 169, 179 or 189. Space time block coding involves transmitting a single spatial stream across multiple antennas, and the recipient device assembles the signals received from multiple antennas back to the original signal that is transmitted in one of single, partial or full concurrent interfering transmission modes.

The wireless access point 107 contains a wireless transceiver circuitry 125 that enables adaptations to one of the single transmissions mode, partial concurrent interfering transmission modes, full concurrent transmission mode and MIMO transmission modes. The wireless transceiver circuitry 125 further contains MIMO wireless transceiver circuitry 121 that is communicatively coupled to a plurality of antennas 127, and single and concurrent interfering transmission and reception circuitry 123. A processing circuitry 111 and primary controller 113 control the adaptation aspects of the wireless access point 107. Storage 115 may contain necessary software, such as single/concurrent interfering transmission and detection processing software 117 and MIMO processing software 119 that help process the received data in various modes. The wireless end point devices such as 179 and 189 may also have a plurality of antennas, such as 191 and 193, associated with MIMO capabilities or otherwise. An upstream transceiver 109 communicatively couples the wireless access point 107 to a backbone network such as Internet 151.

One embodiment of the wireless access point construction is described with reference to the FIG. 2, and the corresponding wireless transceiver circuitry is described in detail with reference FIGS. 3 and 4. A MIMO/concurrent interfering transmission capable end point device construction is described with reference to the FIG. 5.

For example, the wireless access point 107 may be installed in a public environment such as in a building and may serve a plurality of floating wireless end point devices such as 169, 179 and 189. The floating wireless end point devices 169, 179 and 189 may be notebook computers or handheld computing devices of residents or visitors of the building who utilize the services of wireless access point 107. Since there may be many visitors visiting the building at different times, number of people who utilize the wireless access point's 107 services is unpredictable and load on the wireless access point 107 varies throughout the day. The wireless access point 107 periodically assesses the channel conditions and determines number of wireless end point devices 169, 179 and 189 that are utilizing the services and their capabilities, and further assesses interference and noise within the building environment. By considering all these factors, then the wireless access point 107 selects a suitable transmission mode and informs the plurality of notebook computers or handheld computing devices regarding the transmission mode during a next frame. In addition, the wireless access point 107 adapts to the changing channel conditions, by utilizing MIMO transmission modes. This is done by independently considering capabilities of each of the MIMO transmission capable devices, such as 189.

Figure 2:
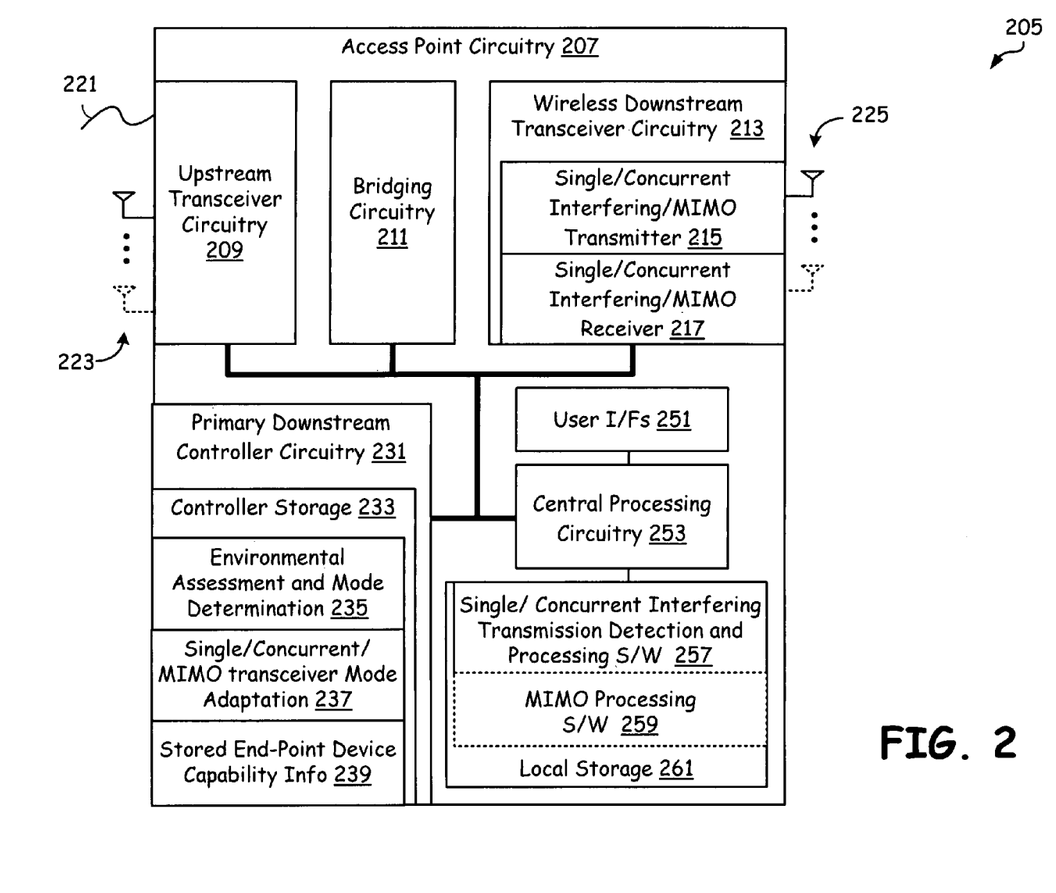
FIG. 2 is a schematic block diagram of a wireless access point built in accordance with the embodiment of FIG. 1.

FIG. 2 is a schematic block diagram of a wireless access point 205 built in accordance with the embodiment of FIG. 1. The wireless access point circuitry 207 may represent any of the wireless access points, such as 107 of FIG. 1 that route data packets. The wireless access point circuitry 207 generally includes central processing circuitry 253, local storage 261, user interfaces 251, upstream transceiver circuitry 209, bridging circuitry 211, wireless downstream transceiver circuitry 213 and primary downstream controller circuitry 231. These components communicatively coupled to one another via one or more of a system bus, dedicated communication pathways, or other direct or indirect communication pathways. The central processing circuitry 253 may be, in various embodiments, a microprocessor, a digital signal processor, a state machine, an application specific integrated circuit, a field programming gate array, or other processing circuitry. In addition, in various embodiments, the primary downstream controller circuitry 231 may be a controller card or part of a wireless access point circuitry card containing a microcontroller or microprocessor.

Local storage 261 may be random access memory, read-only memory, flash memory, a disk drive, an optical drive, or another type of memory that is operable to store computer instructions and data. The local storage 261 contains software components such as single/concurrent interfering transmission and detection and processing software 257 and optionally MIMO processing software 259 that process received data in cases of single transmission capable, concurrent interfering transmission capable, MIMO/single transmission capable and MIMO/concurrent interfering transmission capable devices. These software components utilize information processing techniques to provide concurrent interfering and MIMO wireless routing facilities to a plurality of MIMO and concurrent interfering transmission capable end point devices. In addition, they also resolve plurality of concurrent interfering receptions in partial concurrent transmission modes and full concurrent transmission modes. The single/concurrent interfering transmission and detection and processing software 257 may include concurrent interfering detection algorithms and concurrent interfering transmission algorithms which assist in processing the data received from the concurrent interfering transmission capable devices.

The decisions regarding single transmission mode, partial concurrent interfering transmission modes, full concurrent interfering transmission mode and MIMO transmission modes, as well as contention period and contention free period are transmitted to the wireless end point devices during a beacon period, by the primary downstream controller circuitry 231. During the beacon period, the primary downstream controller circuitry 231 informs about the duration of frame or each of the portions of frame, mode(s) and payload lengths to the associated devices, as applicable to next frame(s) or sub-frame(s). The primary downstream controller circuitry 231 determines the durations of these portions based upon many criteria such as number of associated wireless end point devices within a cell, their capabilities, anticipated bandwidth usage, QOS (Quality of Service) demands, priority of service, idle states, cell overlap interferences, near-far interferences and noises. The beacon signals control the aspects of end point wireless devices that include mode of transmission, contention free period accesses and contention period arbitrations. All associated wireless end point devices listen to beacon signals and plan their communication accordingly. In addition, the primary downstream controller circuitry 231 contains controller storage 233. The controller storage 231 contains programming codes such as environmental assessment and mode determination 235 and single/concurrent interfering/MIMO transceiver mode adaptation 237 that assist primary downstream controller circuitry 231 to determine a current channel condition, during an initial or a periodic assessment, and assist in the wireless downstream transceiver circuitry's 213 mode adaptations. Stored endpoint device capability information 239 assist primary downstream controller circuitry 231 in making decisions regarding adaptations to varying channel conditions.

The wireless downstream transceiver circuitry 213 is equipped with single/concurrent interfering/MIMO transmitter 215 and single/concurrent interfering/MIMO receiver 217 to handle the physical layer of protocol. Detailed descriptions of single/concurrent interfering/MIMO transmitter 215 and single/concurrent interfering/MIMO receiver 217 may be found with reference to the FIGS. 3 and 4, respectively. The wireless downstream transceiver circuitry 213 is capable of transmitting and receiving in all four modes, that is, single transmission and receptions, concurrent interfering transmission and receptions, MIMO/single transmission and receptions, and MIMO/concurrent interfering transmission and receptions. The wireless downstream transceiver circuitry 213 is communicatively coupled to a plurality of antennas 225 that help communicate using a plurality of radio channels, in MIMO transmission and reception modes. In one embodiment, the software information processing components mentioned above with regards to the local storage 261 may exist in storage (not shown) of wireless downstream transceiver circuitry 213, to facilitate faster processing.

A bridging circuitry 211 allows bridging of the wireless access point 207 with other wireless access points as well as bridge with a backbone network via an upstream transceiver circuitry 209. The upstream transceiver circuitry 209 contains wired and wireless packet switched interfaces that provides the wireless access point ability to communicatively couple with a backbone network such as Internet, and is connected to a plurality of antennas 223 as well as a wire 221 that communicatively couples to the backbone network. In other embodiments, the access point circuitry 207 of the present invention may include fewer or more components than are illustrated as well as lesser or further functionality. In other words, the illustrated wireless device is meant to merely offer one example of possible functionality and construction in accordance with the present invention.

Figure 3:
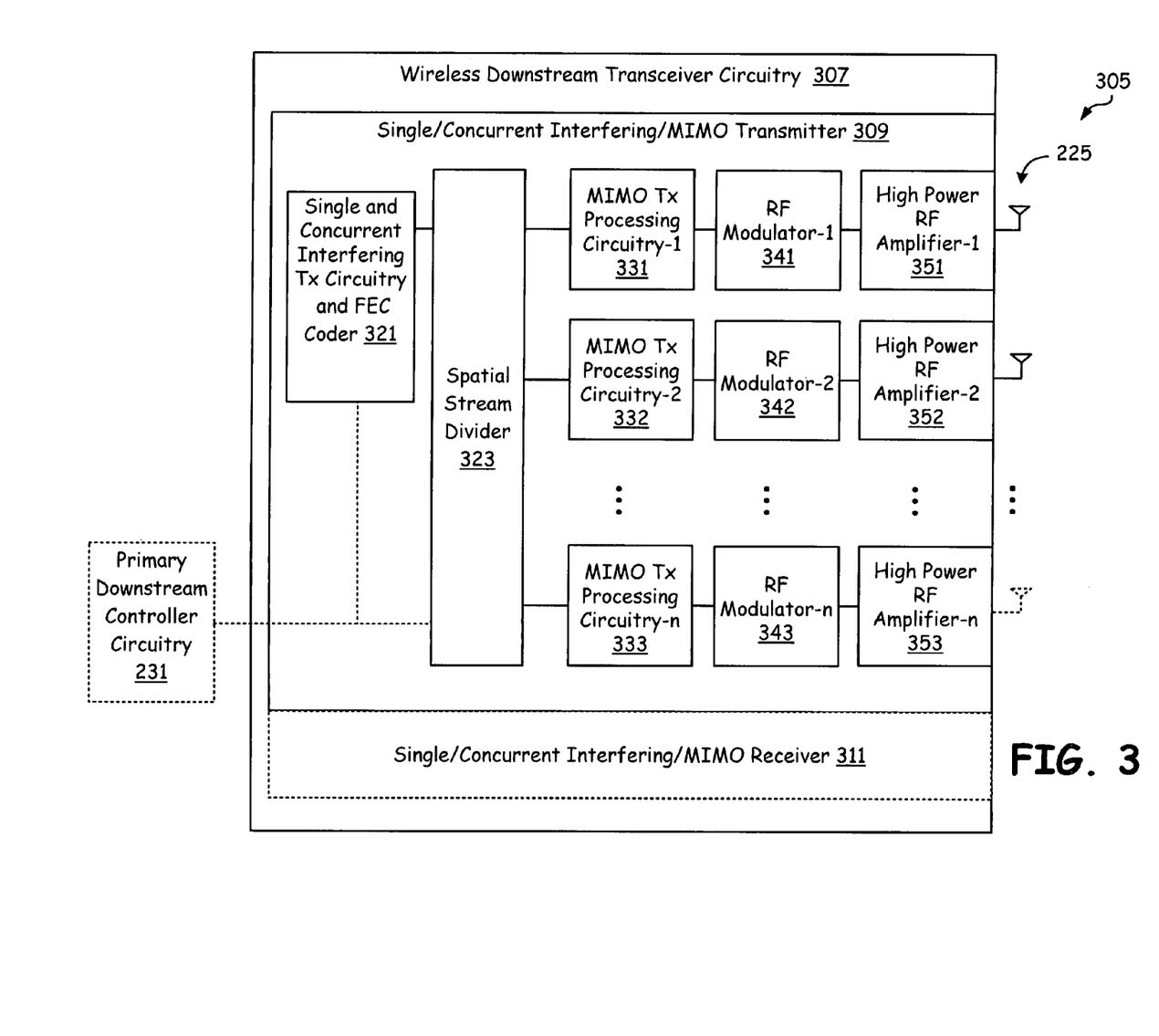
FIG. 3 is a schematic block diagram illustrating downstream transmitter portion of a wireless access point, built in accordance with the embodiment of FIG. 2.

FIG. 3 is a schematic block diagram 305 illustrating downstream transmitter portion 309 of a wireless access point, built in accordance with the embodiment of FIG. 2. The wireless downstream transceiver circuitry 307 contains single/concurrent interfering/MIMO transmitter 309 and single/concurrent interfering/MIMO receiver 311. The illustration shows single/concurrent interfering/MIMO transmitter 309 (the downstream transmitter portion) in detail.

The single/concurrent interfering/MIMO transmitter 309 contains a plurality of radio transmitters, each containing a MIMO transmitter (TX) processing circuitry, RF (Radio Frequency) modulator and high power RF amplifier. Such radio channels are illustrated in Figure as 331, 341, 351 (radio transmitter-1), 332, 342, 352 (radio transmitter-2) and 333, 343, 353 (radio transmitter-n). The MIMO transmitter (TX) processing circuitry 1 through n (331 through 333) utilize information processing techniques that are necessary for a MIMO transmission. Each of these radio transmitters 1 though n are communicatively coupled to a respective antenna (225 of FIG. 2). Typically, in a wireless access point, there may be 2 to 3 such radio transmitters, in some cases more.

Each of these radio transmitters 1 through n transmit one of many spatial streams received from a spatial stream divider 323. The radio transmitters 1 through n transmit these spatial streams in multiple paths, taking advantage of multipath propagation and maximizing data rates. The radio transmitters 1 through n and spatial stream divider 323 utilize space time block coding. A primary downstream controller circuitry (231 of FIG. 2) determines the number of radio transmitters (from 1 through n) to be utilized while communicating with a particular MIMO capable wireless end point device based on prevailing conditions of radio channel. A single and concurrent interfering transmitter circuitry and FEC coder 321, based on the decisions of the primary downstream controller circuitry (231 of FIG. 2) provides signals to the spatial stream divider 323 in one of single, partial or full concurrent transmission modes. In other embodiments, the single/concurrent interfering/MIMO transmitter 309 of the present invention may include fewer or more components than are illustrated as well as lesser or further functionality. In other words, the illustrated wireless transmitter is meant to merely offer one example of possible functionality and construction in accordance with the present invention.

Figure 4:
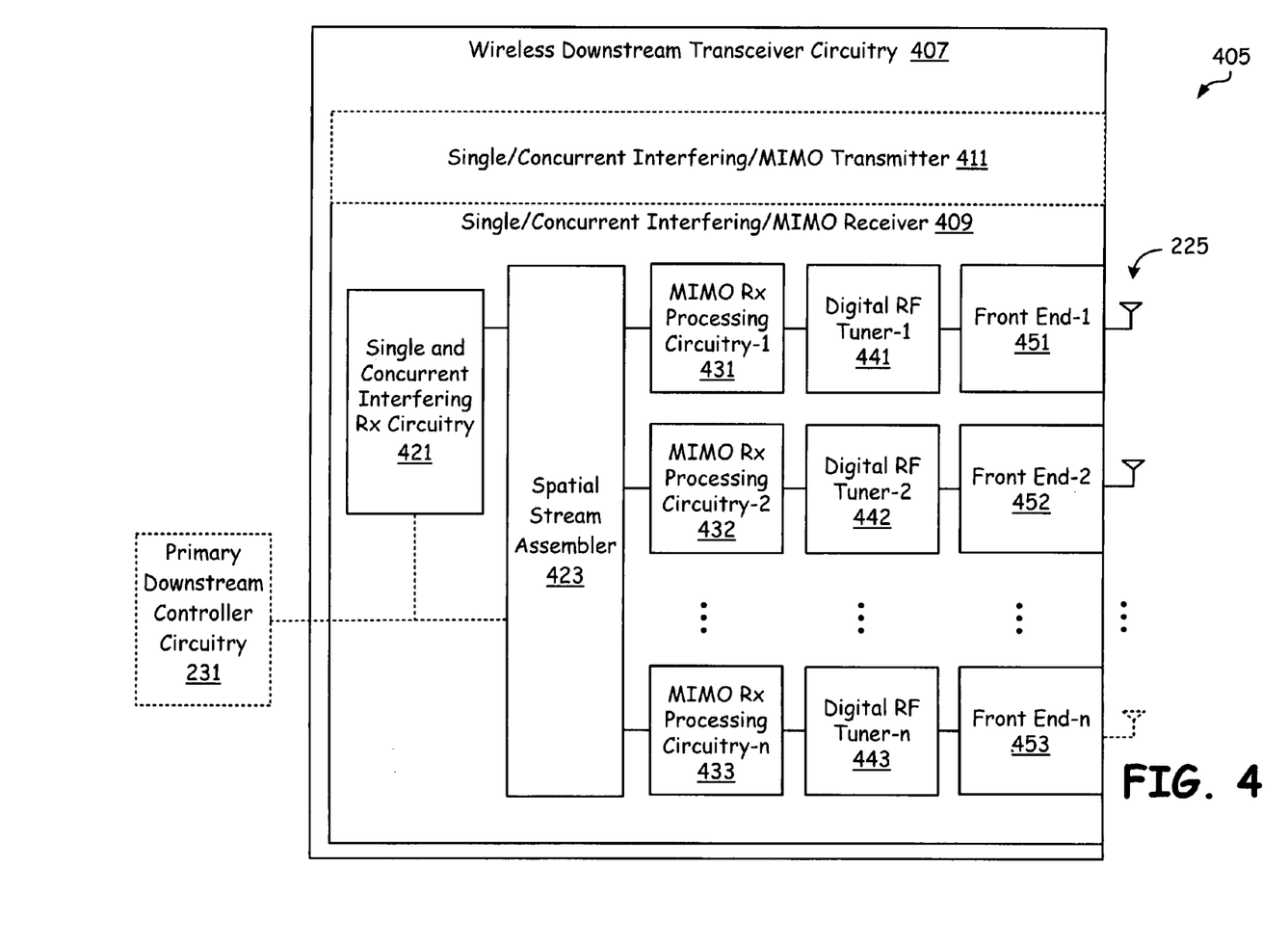
FIG. 4 is a schematic block diagram illustrating downstream receiver portion of a wireless access point, built in accordance with the embodiment of FIG. 2.

FIG. 4 is a schematic block diagram illustrating downstream receiver portion 409 of a wireless access point, built in accordance with the embodiment of FIG. 2. The wireless downstream transceiver circuitry 407 contains single/concurrent interfering/MIMO transmitter 411 and single/concurrent interfering/MIMO receiver 409. The illustration shows single/concurrent interfering/MIMO receiver 409 (the downstream receiver portion) in detail.

The single/concurrent interfering/MIMO receiver 409 contains a plurality of radio receivers, each containing a MIMO receiver (Rx) processing circuitry, digital RF (Radio Frequency) tuner and front end. The front end 451 through 453 are communicatively coupled to a respective antenna (225 of FIG. 2). The front end 451 through 453 contain down converters and RF amplifiers (not shown) to down-convert and amplify received RF signals. The digital RF tuners 441 through 443 tune to a particular frequency that corresponds to the current receiver. The MIMO receiver (Rx) processing circuitry 1 through n (431 through 433) utilize information processing techniques to process the received (tuned) MIMO signals. Such radio channels 431, 441, 451 (radio receiver-1), 432, 442, 452 (radio receiver-2) and 433, 443, 453 (radio receiver-n) form n radio receivers of the single/concurrent interfering/MIMO receiver 409. Typically, in a wireless access point, there may be 2 to 3 such radio receivers (each radio receiver having a corresponding transmitter), in some cases more.

Each of these radio receivers 1 through n receive one of many spatial streams and deliver them to a spatial stream assembler 423. A primary downstream controller circuitry (231 of FIG. 2) determines the number of radio receivers (from 1 through n) to be utilized while communicating with a particular MIMO capable wireless end point device, based upon the MIMO transmission mode. A single and concurrent interfering receiver circuitry 421, based on the decisions of the primary downstream controller circuitry (231 of FIG. 2), processes the received single, partial or full concurrent transmission and resolves multiple signals. In other embodiments, the single/concurrent interfering/MIMO receiver 409 of the present invention may include fewer or more components than are illustrated as well as lesser or further functionality. In other words, the illustrated wireless transmitter is meant to merely offer one example of possible functionality and construction in accordance with the present invention.

Figure 5:
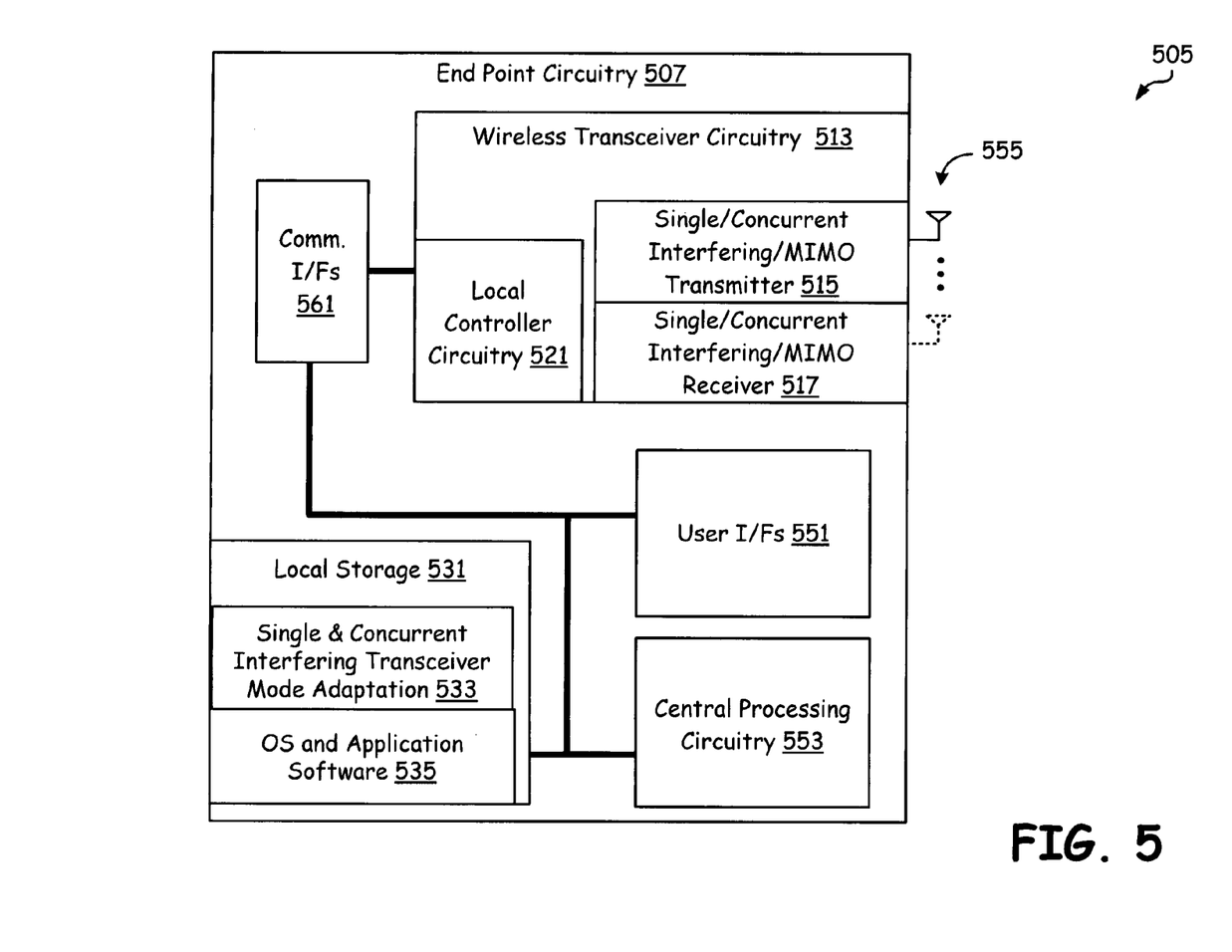
FIG. 5 is a schematic block diagram of a wireless end point device built in accordance with the embodiment of FIG. 1.

FIG. 5 is a schematic block diagram 505 of a wireless end point device 507 built in accordance with the embodiment of FIG. 1. The wireless end point device circuitry 507 may represent any of the wireless end point devices from which packets originate or within which packets terminate and may represent any of the MIMO/concurrent interfering transmission capable wireless end point devices of FIG. 1, such as 189. The wireless end point device 507 generally includes central processing circuitry 553, local storage 531, user interfaces 551, wireless transceiver circuitry 513 and communication interfaces 561. These components communicatively coupled to one another via one or more of a system bus, dedicated communication pathways, or other direct or indirect communication pathways.

The central processing circuitry 553 may be, in various embodiments, a microprocessor, a digital signal processor, a state machine, an application specific integrated circuit, a field programming gate array, or other processing circuitry. In addition, in various embodiments, the wireless transceiver circuitry 513 may consist of a local controller circuitry 521 containing a microcontroller or microprocessor. Local storage 531 may be random access memory, read-only memory, flash memory, a disk drive, an optical drive, or another type of memory that is operable to store computer instructions and data. The local storage 531 contains device operating system and application software 535 and single and concurrent interfering transceiver mode adaptation code 533. The communication interface 561 allows the wireless end point device 507 to interface with the wireless transceiver circuitry 513.

The local controller circuitry 521 manages control functionality of wireless transceiver circuitry 513, by planning communication in one of single transmission mode, a plurality of partial concurrent interfering transmission modes, full concurrent interfering transmission mode and MIMO transmission modes during any given single frame, group of frames or a portion of frame. The local controller circuitry 521 listens to the control signals during beacon period and adheres to the adapted frame characteristics. The control functionality of the wireless transceiver circuitry 513 include generating radio capability information and transmitting it to a wireless access point during a beacon period as well as receiving the control signals from an associated wireless access point, interpreting it and plan communication accordingly. In addition, the local control circuitry 521 manages MIMO functionality of the wireless transceiver circuitry 513, by determining number of radio channels to be used for spatial streams during transmissions and receptions.

The wireless transceiver circuitry 513 is also equipped with a single/concurrent interfering/MIMO transmitter 515 and single/concurrent interfering/MIMO receiver 517. The wireless transceiver circuitry 513 is capable of performing both single, concurrent interfering and MIMO transmission and receptions. A plurality of antennas 555 communicatively coupled to the wireless transceiver circuitry 513 enable transmission and receptions in MIMO transmission mode. The functioning and construction of single/concurrent interfering/MIMO transmitter 515 and single/concurrent interfering/MIMO receiver 517 correspond closely to that of downstream transmitter and receiver portions of a wireless access point described with reference to the FIGS. 3 and 4 respectively. However, the number of radio channels may be minimal and processing complexity may also be minimal. In other embodiments, the wireless end point device circuitry 507 of the present invention may include fewer or more components than are illustrated as well as lesser or further functionality. In other words, the illustrated wireless device is meant to merely offer one example of possible functionality and construction in accordance with the present invention.

Figure 6:
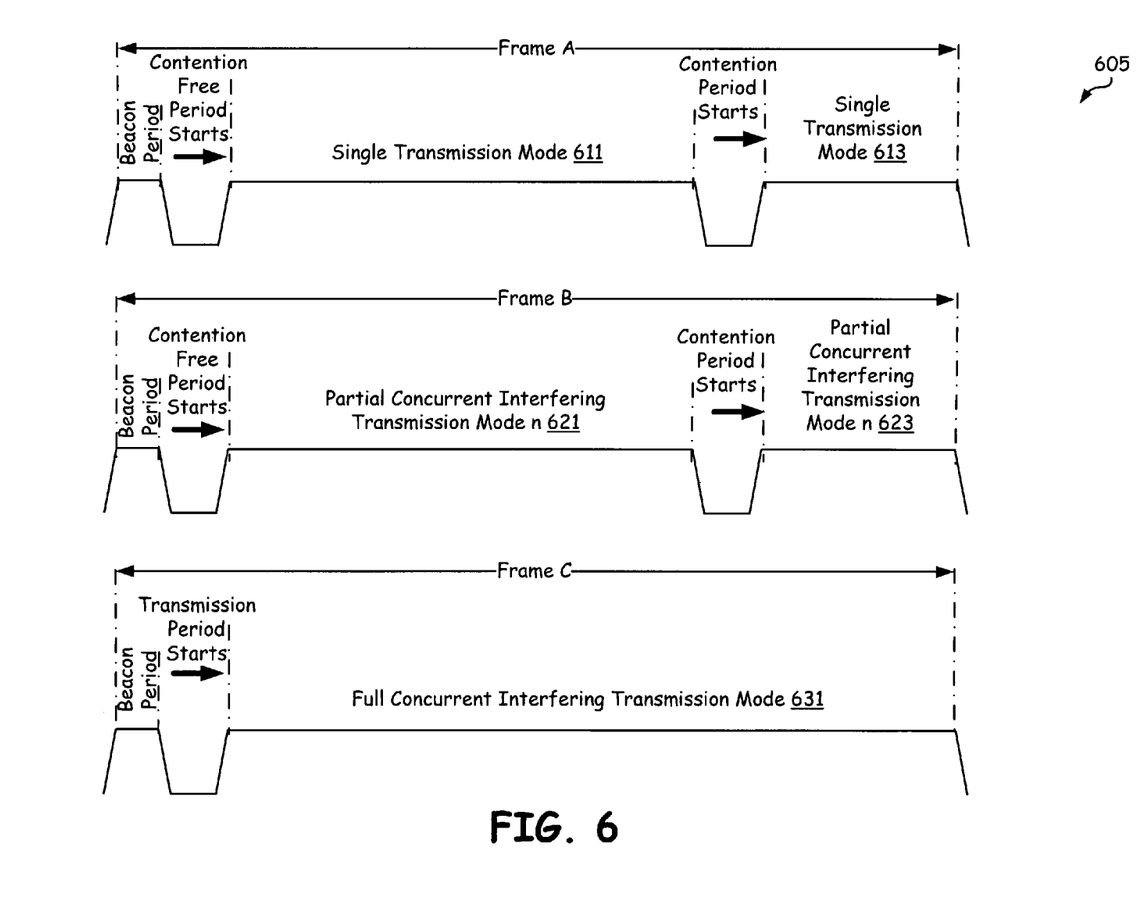
FIG. 6 is an exemplary timing diagram illustrating single, partial concurrent interfering and full concurrent interfering transmission modes, during contention free and contention periods.

FIG. 6 is an exemplary timing diagram 605 illustrating single, partial concurrent interfering and full concurrent interfering transmission modes, during contention free and contention periods. As illustrated, frame A contains a beacon period, single contention free transmission period 611 and single contention transmission period 613. Frame A is adapted by varying duration of single transmission modes 611 and 613 (refer to Frame A). Similarly, frame B contains a beacon period, one of partial concurrent interfering contention free transmission period 621 and partial concurrent interfering contention period 623. The partial concurrent interfering transmission modes may vary, for example, from a through n, depending on number of wireless end point devices selected for communication during the frame. Frame B is adapted by varying duration of the partial concurrent interfering transmission modes 621 and 623 (refer to Frame B). Frame C contains a beacon period followed by a full concurrent interfering transmission period 631 (refer to Frame C). The payload length may also be varied in accordance with channel conditions. The illustration of frames A, B and C correspond to an entire frame approach, wherein the contention free and contention periods are not divided into sub-frames. In a sub-frame approach (not shown), both contention period and contention free periods are broken into sub-frames, each sub-frame adapting one of the single, partial and full concurrent interfering modes.

The channel conditions are determined on the basis of number of associated wireless end point devices within the cell, their capabilities, anticipated bandwidth usage, QOS (Quality of Service) demands, priority of service and idle states, cell overlap interferences, near-far interferences and noises. In single transmission mode, contention free period duration 611 and contention period duration 613 are varied in accordance with channel conditions, to optimize the performance of the wireless access point. Similarly, in partial concurrent interfering transmission mode n, the contention free period duration 621 and contention period duration 623 are varied in accordance with channel conditions. The partial concurrent interfering transmission mode allows a limited number of wireless end point devices to transmit or receive data concurrently, and this occurs on the basis of channel being free for transmission or reception in contention free period and on the basis of contention and arbitration during contention period. In case of a full concurrent interfering transmission mode, the transmission period duration 631 is varied in accordance with channel conditions. In full concurrent interfering transmission mode, no restrictions are enforced on wireless end point devices to transmit and receive.

The beacon signals that determine the accesses to wireless access point in various modes during both contention free period and contention period, and are transmitted to the MIMO/single transmissions capable devices and MIMO/concurrent interfering transmissions capable devices during the beacon period. The access modes include both single transmissions mode, partial concurrent interfering transmission modes a through n, and full concurrent interfering transmissions mode. The decision to provide access in any mode and the duration of access depends on the wireless end point device capabilities and the wireless access point performance considerations. The beacon signals control the aspects of wireless end point devices that include mode of transmission, contention free period accesses and contention period arbitrations. All associated wireless end point devices respond to the beacon signals and plan their communication accordingly.

Figure 7:
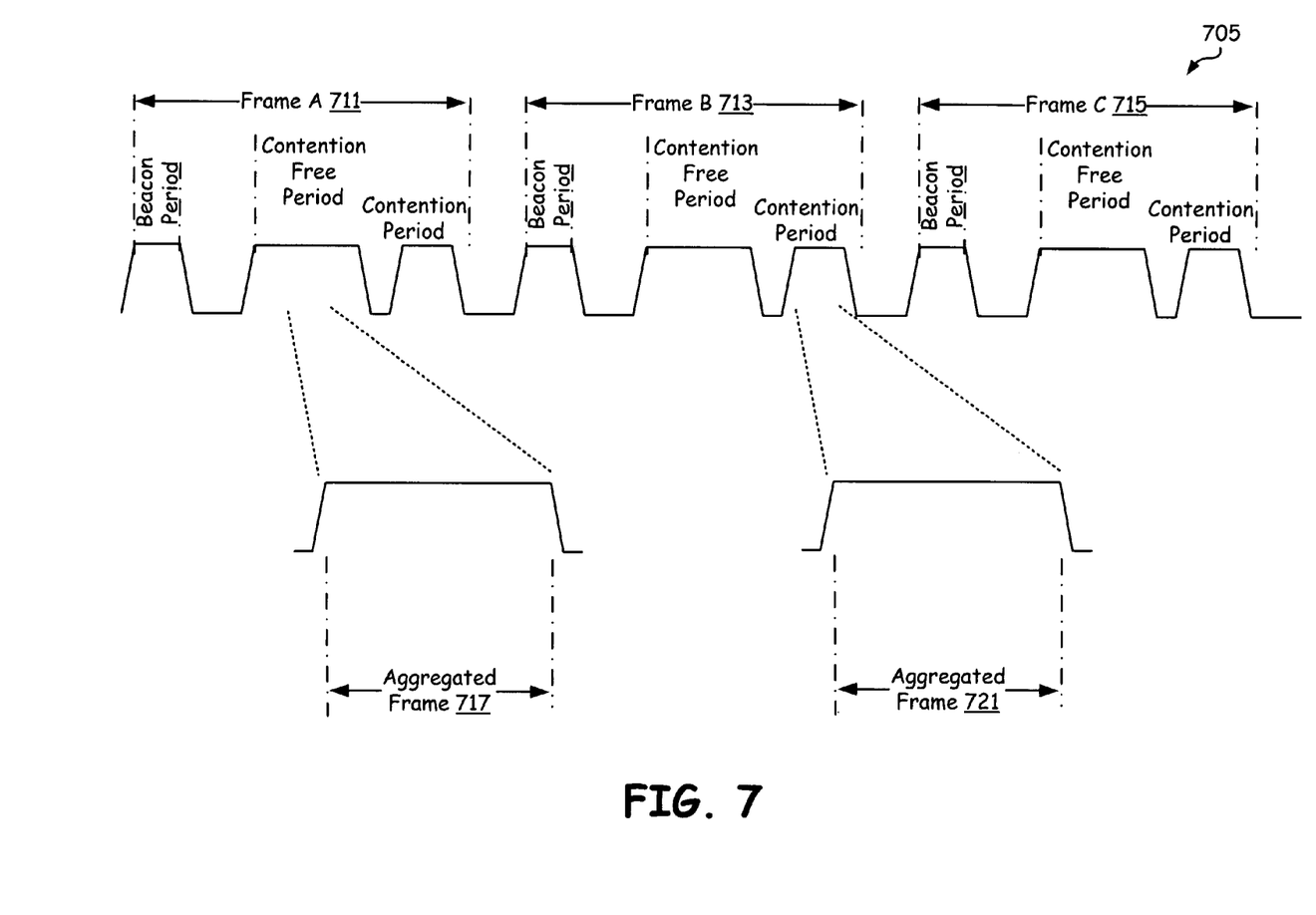
FIG. 7 is an exemplary timing diagram illustrating aggregation of frames destined to a specific wireless end point device, in a MIMO transmission mode.

FIG. 7 is an exemplary timing diagram 705 illustrating aggregation of frames destined to a specific wireless end point device, in a MIMO transmission mode. In MIMO transmission mode, irrespective of whether the incoming signals are in single, partial or full concurrent interfering mode, when many packets that are destined for one or selected number of recipient wireless end point devices, they are aggregated and transmitted using space time block code. The illustration shows three frames, frames A 711, B 713 and C 715. Each of these frames contains a beacon period, contention free period and contention period. The illustration further shows two aggregated frames 717 and 721.

In single transmission mode, a MIMO transmission may involve aggregation of many packets destined to a unique recipient wireless end point device. These aggregated packets are divided into spatial streams and wirelessly transmitted to the recipient wireless end point device. The recipient wireless end point device assembles these spatial streams and then deaggregates the aggregated frame to resolve packets.

In a partial concurrent interfering transmission mode, a MIMO transmission may involve aggregation of packets destined to a selected number of recipient wireless end point devices. Similar to the above mentioned MIMO/single transmission, these packets are transmitted in a plurality of spatial streams. The recipient wireless end point devices assemble the received spatial streams, deaggregate the packets and resolve partial concurrent interfering transmissions.

Figure 8:
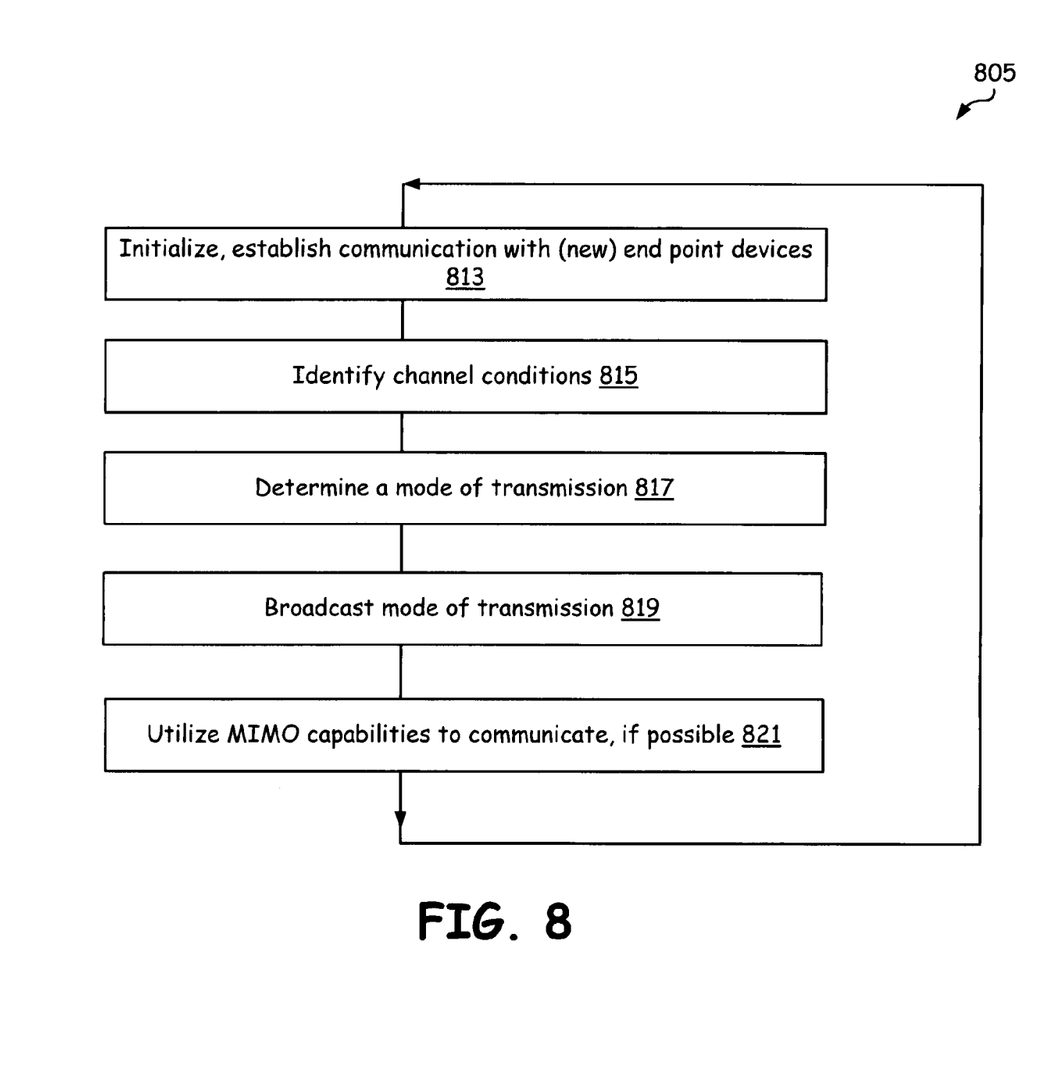
FIG. 8 is a flow diagram illustrating general functionality of a wireless access point that adapts parameters of concurrent interfering and Multiple Input/Multiple Output (MIMO) transmissions and receptions, based on varying channel conditions, in accordance with the present invention.

FIG. 8 is a flow diagram 805 illustrating general functionality of a wireless access point that adapts parameters of concurrent interfering and Multiple Input/Multiple Output (MIMO) transmissions and receptions, based on varying channel conditions, in accordance with the present invention. The functionality of the wireless access point begins at a block 813 wherein the wireless access point initializes by making initial assessment of the cell, by establishing communication with the end point devices. The initial assessment includes identifying the number of wireless end point devices that are attempting to access a backbone network. In addition, the wireless access point queries each of the plurality of wireless end point devices regarding capabilities (in case of a periodic assessment, only new wireless end point devices that arrive into the cell), demands of quality of service, anticipated bandwidth usage and idle states. As a part of initial assessment the wireless access point also identifies any noises and interferences that may occur within the cell. The capabilities of the plurality of wireless end point devices may include single transmissions and receptions capabilities, concurrent interfering transmissions and receptions capabilities or both, and MIMO transmission and reception capabilities.

At a next block 815, the wireless access point identifies channel conditions. Identification of channel conditions may involve arriving at one or more numerical indicators based on initial or periodic assessment mentioned above, so as to be able to determine a mode of transmission for an optimized performance. At a next block 817, the wireless access point determines a mode of transmission. The modes of transmission include single transmission mode, a plurality of partial concurrent interfering transmission modes (say, partial concurrent interfering transmission modes a through n), full concurrent interfering transmission mode and a plurality of MIMO transmission modes (utilizing two or more transceivers). The adaptation considerations also include payload duration variations. The considerations for adaptation are different for transmission and reception, since the wireless access point's load conditions during transmissions and receptions may vary independently.

Then, at a next block 819, the wireless access point broadcasts mode selection that is applicable to a next frame, a group of sub-frames, or a group of frames within the wireless network infrastructure, during a beacon period. In addition, the wireless access point independently communicates MIMO transmission modes to each of the wireless end point devices that possess MIMO capabilities. At a next block 821, the wireless access point provides routing facilities to the wireless end point devices in one or more of selected modes.

Figure 9:
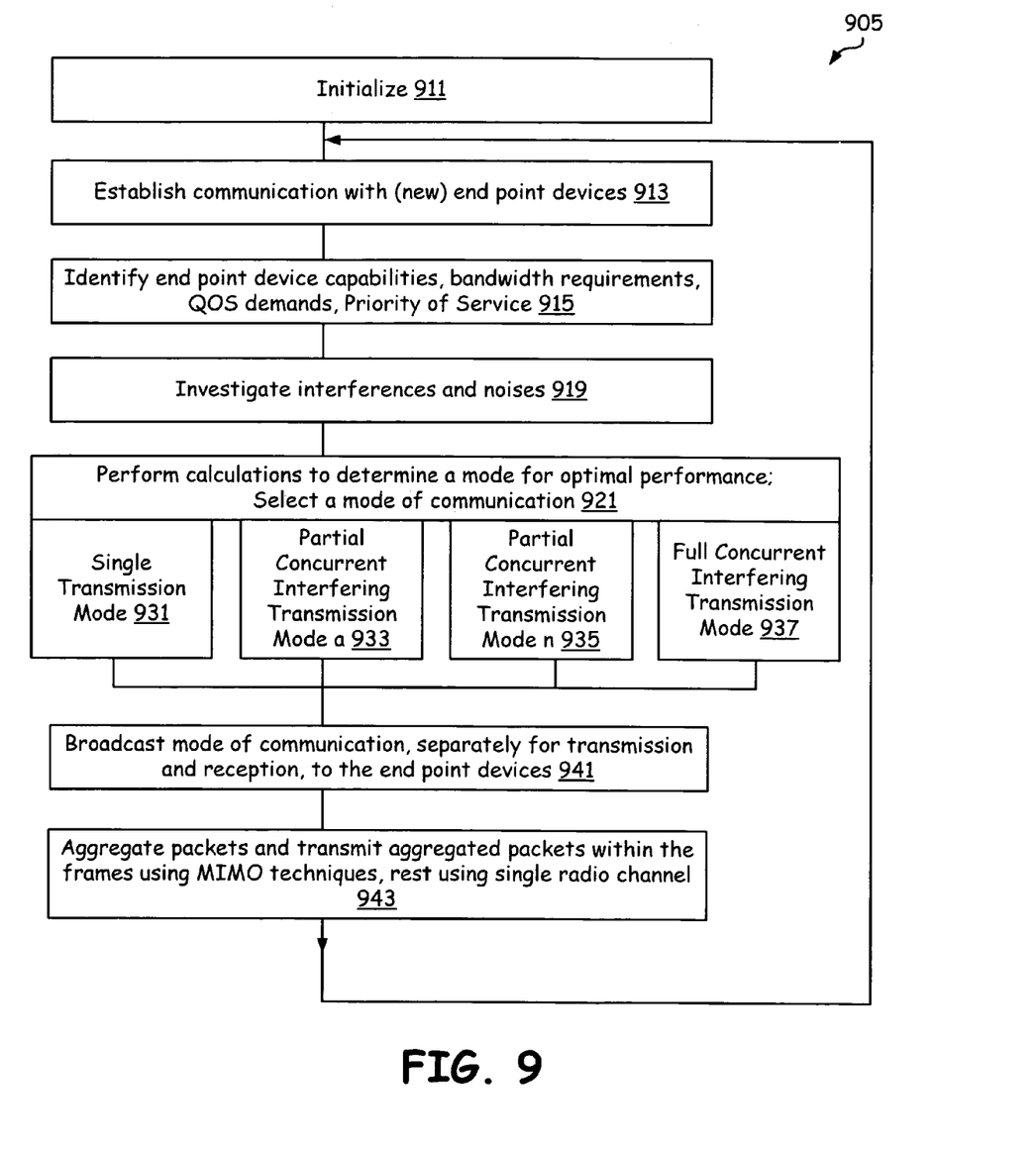
FIG. 9 is a flow diagram illustrating detailed functionality of a wireless access point that adapts parameters of concurrent interfering and Multiple Input/Multiple Output (MIMO) transmissions and receptions, based on varying channel conditions, in one embodiment of the present invention.

FIG. 9 is a flow diagram 905 illustrating detailed functionality of a wireless access point that adapts parameters of concurrent interfering and Multiple Input/Multiple Output (MIMO) transmissions and receptions, based on varying channel conditions, in one embodiment of the present invention. The functionality of the wireless access point begins at a block 911, when the access point initializes by making initial assessment of cell. The initial assessment includes identifying the number of associated wireless end point devices, querying each of the plurality of wireless end point devices regarding capabilities, demands of quality of service, anticipated bandwidth usage and idle states. In addition, the wireless access point identifies noises and interferences within the cell. The capabilities of the plurality of wireless end point devices may include single transmissions and receptions capabilities, concurrent interfering transmissions and receptions capabilities and MIMO capabilities.

At a next block 913, the wireless access point establishes communication with wireless end point devices during a beacon period. In a periodic assessment, the access point may attempt to establish communication with new wireless end point devices that entered the cell recently. At a next block 915, the wireless access point identifies device capabilities of the newly entered wireless end point devices, bandwidth requirements, QOS demands and priority of service. The capabilities include single transmissions and receptions capabilities, concurrent interfering transmissions and receptions and MIMO capabilities. At a next block 919, the wireless access point investigates interferences and noises within the cell.

At a next block 921, the wireless access point performs calculations to determine a mode that provides for an optimal performance and selects that mode of communication. In conjunction with of periodic assessment, the wireless access point may also use triggers to select one of the communication modes. The trigger may be a new noise or interference, or sudden entry of one or more new wireless end point devices. The modes are illustrated as event blocks such as single transmission mode 931, single transmission mode 931, partial concurrent interfering transmission mode a 933, partial concurrent interfering mode n 935 and full concurrent interfering transmission mode 937. The partial concurrent interfering transmission modes a and n illustrated may in practice be many more that range from a through n, depending upon the number of wireless end point devices selected for concurrent interfering transmission. Once a mode is selected, the wireless access point informs this to wireless end point devices by broadcasting it, at a next block 941. The considerations for transmission and receptions, from the point of view of wireless access point, may be different and are also informed to the wireless end point devices.

At a next block 943, the wireless access point aggregates packets, depending upon single, partial concurrent interfering or full concurrent interfering transmission modes, and transmits aggregated packets within the frames using MIMO techniques, while other portions of the frames are transmitted using single radio channel. In a single transmission mode, for example, only packets that are destined for a unique recipient address may be aggregated, while in partial concurrent interfering transmission modes, only packets destined for a selected number of recipient addresses may be aggregated.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. An access point circuitry that supports reception of concurrent interfering transmissions utilizing a multiple input/multiple output technique from a plurality of end point devices, the access point circuitry comprising:
   receiver circuitry operable to receive the concurrent interfering transmissions from the plurality of end point devices, comprising a multiple input/multiple output transceiver circuitry;
   processing circuitry, communicatively coupled to the receiver circuitry, that is operable to decode the concurrent interfering transmissions;
   transmitter circuitry communicatively coupled to the processing circuitry;
   the processing circuitry, based on a change in a channel condition is operable to generate an instruction to change at least one frame parameter using the multiple input/multiple output technique;
   the processing circuitry is operable to deliver the instruction to at least one of the plurality of end point devices via the transmitter circuitry;
   the receiver circuitry is operable to receive the concurrent interfering transmissions, utilizing the multiple input/multiple output transceiver circuitry; and
   the processing circuitry is operable to decode the received concurrent interfering transmissions; and
   the processing circuitry based on channel conditions during subsequent frames, wherein the channel conditions during subsequent frames includes a number of the plurality of end point devices associated with the access point circuitry, is operable to:
      generate an instruction directing communication using a single transmission mode during a first frame, wherein the first frame includes: a beacon period, contention free transmission period having a first single transmission mode and a contention period having a second single transmission mode;
      generate an instruction directing communication using a partial concurrent interfering transmission mode during a second frame, wherein the second frame includes: a beacon period, contention free transmission period having a first partial concurrent interfering transmission mode, a contention period having a second partial concurrent interfering transmission mode; and
      generate an instruction directing communication using a full concurrent transmission mode during a third frame, wherein the third frame includes: a beacon period and a full concurrent interfering transmission mode period.

2. The access point circuitry of claim 1, wherein the processing circuitry further generating an instruction to change at least one parameter related to the multiple input/multiple output technique.

3. The access point circuitry of claim 2, wherein the multiple input/multiple output transceiver circuitry adapts to the change in the at least one parameter related to the multiple input/multiple output technique, in response to the instruction.

4. The access point circuitry of claim 2, wherein the parameter related to the multiple input/multiple output technique determines a concurrent interfering transmission mode.

5. The access point circuitry of claim 4, wherein the concurrent interfering transmission mode comprising a mode that allows selected few of plurality of transceiver circuitry that is built into the multiple input/multiple output transceiver circuitry to transmit during a frame.

6. The access point circuitry of claim 1, wherein the change in the at least one frame parameter is applicable to a frame.

7. The access point circuitry of claim 6, wherein the frame parameter comprising duration of the frame.

8. The access point circuitry of claim 6, wherein the frame parameter comprising payload length.

9. The access point circuitry of claim 6, wherein the frame parameter determines a concurrent interfering transmission mode.

10. The access point circuitry of claim 9, wherein the partial concurrent interfering transmission mode comprising a mode that allows selected few of the plurality of end point devices to transmit during the frame.

11. The access point circuitry of claim 9, wherein the full concurrent interfering transmission mode comprising a mode that allows any of the plurality of end point devices to transmit during the frame.

12. An end point device circuitry that supports concurrent interfering receptions and multiple input/multiple output receptions, the end point device circuitry comprising:
   receiver circuitry that is operable to receive a concurrent interfering transmission utilizing a multiple input/multiple output technique, wherein the concurrent interfering transmission is included in a first frame having a beacon period, contention free transmission period having a first partial concurrent interfering transmission mode and a contention period having a second partial concurrent interfering transmission mode;
   processing circuitry, communicatively coupled to the receiver circuitry, that is operable to decode the concurrent interfering transmission;
   the processing circuitry is operable to receive an instruction to adapt at least one frame parameter for a next frame;
   the processing circuitry is operable to respond to the instruction by adapting at least one frame parameter for the next frame, the at least one frame parameter indicating that a communication mode should be changed during the next frame from a partial concurrent interfering transmission mode to a full concurrent transmission mode;

the processing circuitry is operable to detect data from a received full concurrent transmission that utilizes the multiple input/multiple output technique during the next frame, wherein the next frame includes: a beacon period and a full concurrent interfering transmission mode period.

13. The end point device circuitry of claim 12, wherein the processing circuitry further receiving instruction to change at least one parameter related to the multiple input/multiple output technique.

14. The end point device circuitry of claim 13, wherein the receiver circuitry adapts to the change in the at least one parameter related to the multiple input/multiple output technique, in response to the instruction.

15. The end point device circuitry of claim 13, wherein the parameter related to the multiple input/multiple output technique determines a concurrent interfering transmission mode.

16. The end point device circuitry of claim 15, wherein the concurrent interfering transmission mode includes a mode that allows a selected few of plurality of transceiver circuitry that is built into the receiver circuitry to receive during a frame.

17. A method performed by an access point that communicates a plurality of packets with a plurality of end point devices, in a wireless network infrastructure, the method comprising:

establishing communication with each of the plurality of end point devices;

identifying channel conditions;

determining a first mode of transmission for a first frame, wherein the first mode of transmission includes a single transmission mode and the first frame includes: a beacon period, contention free transmission period having a first single transmission mode and a contention period having a second single transmission mode;

broadcasting the first mode of transmission;

communicating using the first mode of transmission for the first frame, utilizing multiple input/multiple output capabilities of the access point and the plurality of end point devices;

determining a second mode of transmission for a second frame, the second mode of transmission includes one or more partial concurrent interfering transmission modes, wherein the second frame includes: a beacon period, contention free transmission period having a first partial concurrent interfering transmission mode, a contention period having a second partial concurrent interfering transmission mode;

broadcasting the second mode of transmission;

communicating using the second mode of transmission for the second frame, utilizing multiple input/multiple output capabilities of the access point and the plurality of end point devices;

determining a third mode of transmission for a third frame, the third mode of transmission includes a full concurrent interfering transmission mode, wherein the third frame includes: a beacon period and a full concurrent interfering transmission mode period;

broadcasting the third mode of transmission;

communicating using the third mode of transmission for the third frame, utilizing multiple input/multiple output capabilities of the access point and the plurality of end point devices.

18. The method of claim 17, wherein partial concurrent interfering transmission modes allow the preselected number of the plurality of end point devices to transmit or receive concurrently.

19. The method of claim 17, wherein the multiple input/multiple output modes are determined by the number of transceivers utilized.

20. The method of claim 17, wherein communicating using the first mode of transmission, further comprises:

aggregating packets for transmission to a unique recipient end point device during the first frame.

21. The method of claim 20, wherein communicating using the second mode of transmission, further comprises aggregating packets for a preselected number of the plurality of end point devices for transmission during the second frame.

22. The method of claim 17 wherein the first frame of single transmission mode, second frame of partial concurrent interfering transmission mode and third frame of full concurrent interfering transmission modes are transmitted using space-time block coding.

* * * * *